(12) United States Patent
Baunach et al.

(10) Patent No.: US 7,464,077 B1
(45) Date of Patent: Dec. 9, 2008

(54) QUERYABLE CACHE IN REAL-TIME DATA MANAGEMENT SYSTEM

(75) Inventors: Stephen Baunach, Los Gatos, CA (US); Haam Tham, Milpitas, CA (US)

(73) Assignee: Starview Technology, Inc., San Jose, CA (US)

( * ) Notice: Subject to any disclaimer, the term of this patent is extended or adjusted under 35 U.S.C. 154(b) by 439 days.

(21) Appl. No.: 10/903,862

(22) Filed: Jul. 29, 2004

(51) Int. Cl.
*G06F 7/00* (2006.01)
*G06F 12/00* (2006.01)

(52) U.S. Cl. ............................ 707/3; 707/205; 711/138
(58) Field of Classification Search ................ 707/2–5, 707/100, 205; 711/138
See application file for complete search history.

(56) References Cited

U.S. PATENT DOCUMENTS

| | | | | |
|---|---|---|---|---|
| 5,560,006 A | * | 9/1996 | Layden et al. | 707/2 |
| 5,883,640 A | * | 3/1999 | Hsieh et al. | 345/503 |
| 6,449,695 B1 | * | 9/2002 | Bereznyi et al. | 711/134 |
| 6,601,062 B1 | * | 7/2003 | Deshpande et al. | 707/3 |
| 2004/0034744 A1 | * | 2/2004 | Karlsson et al. | 711/133 |
| 2007/0055555 A1 | * | 3/2007 | Baggett et al. | 705/5 |

* cited by examiner

*Primary Examiner*—Cheyne D Ly
(74) *Attorney, Agent, or Firm*—Beyer Law Group LLP

(57) ABSTRACT

In order to provide real-time data analysis of high speed data, a query control mechanism may be provided and coupled to one or more caches. The caches may temporarily store the incoming high-speed data, and the data from the caches may be periodically swept into a relational database. Upon receipt of a query for real-time data, the query control may determine if one of the caches can fulfill the query. If so, the query is transferred to that cache. If not, the query may be transferred to the relational database. If so, the query is transferred to that cache. If not, the query may be transferred to the relational database. The query control can accomplish this by tracking the time frame of information stored in each cache, such that it is aware of whether or not a particular cache can fulfill a query without first contacting the cache.

26 Claims, 3 Drawing Sheets

Data Source Input
(N1-N5 are Names (ID's) - e.g. GasPressure)

|    | N1  | N2  | N3  | N4  | N5  |
|----|-----|-----|-----|-----|-----|
| t0 | v1  | v2  | v3  | v4  | v5  |
| t1 | v6  | v7  | v8  | v9  | v10 |
| t2 | v11 | v12 | v13 | v14 | v15 |
| t3 | v16 | v17 | v18 | v19 | v20 |
| t4 | v21 | v22 | v23 | v24 | v25 |

Mapping Table
Map input data source name to where it is stored in
the underlying database table.

| SourceName | TableName | TargetName |
|------------|-----------|------------|
| N1         | X0        | F000       |
| N2         | X0        | F001       |
| N3         | X1        | S000       |
| N4         | X1        | S001       |
| N5         | X0        | F002       |

Underlying Database table(s) _ (TargetNames)
[often we use one table per datatype (Float, Integer, String), but this is not required]
Pre-allocated to a large number of columns (e.g. F000 - F999), the mapping logic can
handle distributing data to an unbounded set of tables.

|    | F000 | F001 | F002 | Fnnn | F999 |
|----|------|------|------|------|------|
| t0 | v1   | v2   | v5   |      |      |
| t1 | v6   | v7   | v8   |      |      |
| t2 | v11  | v12  | v10  |      |      |
| t3 | v16  | v17  | v20  |      |      |
| t4 | v21  | v22  | v25  |      |      |

FIG. 2

QUERYABLE CACHE IN REAL-TIME DATA MANAGEMENT SYSTEM

FIELD OF THE INVENTION

The present invention relates to the field of real-time data management infrastructure. More particularly, the present invention relates to a queryable cache in a real-time data management system.

BACKGROUND OF THE INVENTION

Data warehousing involves the gathering, storage, and retrieval of large amounts of information. In the modern age, it is common to perform the data acquisition aspect of data warehousing in real-time, where streaming information may be placed into databases as it arrives. This is especially useful in areas such as manufacturing, where sensor information from various machines may arrive simultaneously and at a high rate of speed.

Simply acquiring the data in real-time, however, is only part of the equation. It is also beneficial to have the data stored in a way that makes it easy to mine. Relational databases are often used for storage, but the organization of the data in the relational database can be critical to efficient mining later. It therefore becomes a priority to not only store the data in real-time, but to store it in a proper format for easy mining.

Additionally, relational databases are typically not used for real-time data analysis. The delay in actual storage times into the relational database, and the complexity of the storage design, typically makes it impractical for real-time analysis of incoming data. In the manufacturing world, however, real-time data analysis can be critical in keeping the production line as efficient as possible. For example, in a microchip fabrication plant, it would be beneficial to have a "feedback loop"-type system where information from sensors examining the production of one portion of the chip may be used in real-time to modify or delay the production of another portion of the chip (or another chip entirely). This allows a manufacturer to correct for deficiencies that might have otherwise resulted in an expensive loss. The feedback loop would aid manufacturers in getting their yield up.

Unfortunately, this problem has proved difficult to solve, as the vast amount of data gathered in these types of systems in a short amount of time make scaling of any solution a major impediment.

Previous solutions have attempted to solve the problems mentioned above by utilizing a name-value schema to quickly store real-time information into persisted memory. While such solutions are indeed able to achieve very fast save rates, queries to the data are very slow, making them unusable for the real-time data analysis described above.

What is needed is a solution that overcomes these deficiencies.

BRIEF DESCRIPTION OF THE INVENTION

In order to provide real-time data analysis of high speed data, a query control mechanism may be provided and coupled to one or more caches. The caches may temporarily store the incoming high-speed data, and the data from the caches may be periodically swept into a relational database. Upon receipt of a query for real-time data, the query control may determine if one of the caches can fulfill the query. If so, the query is transferred to that cache. If not, the query may be transferred to the relational database. The query control can also combine information from the cache and the relational database. The query control can accomplish this by tracking the time frame of information stored in each cache, such that it is aware of whether or not a particular cache can fulfill a query without first contacting the cache.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 2 is an example of a two dimensional table structure utilized to aid in the storage of data into the relational database in accordance with an embodiment of the present invention.

DETAILED DESCRIPTION

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

The present invention utilizes a cache system which is queryable in real-time in a data management system in order to allow the real-time data analysis of high-speed data. The present invention also has the capability to simultaneously store the data in a relational database in a format that makes mining operations easier.

Figure 1:
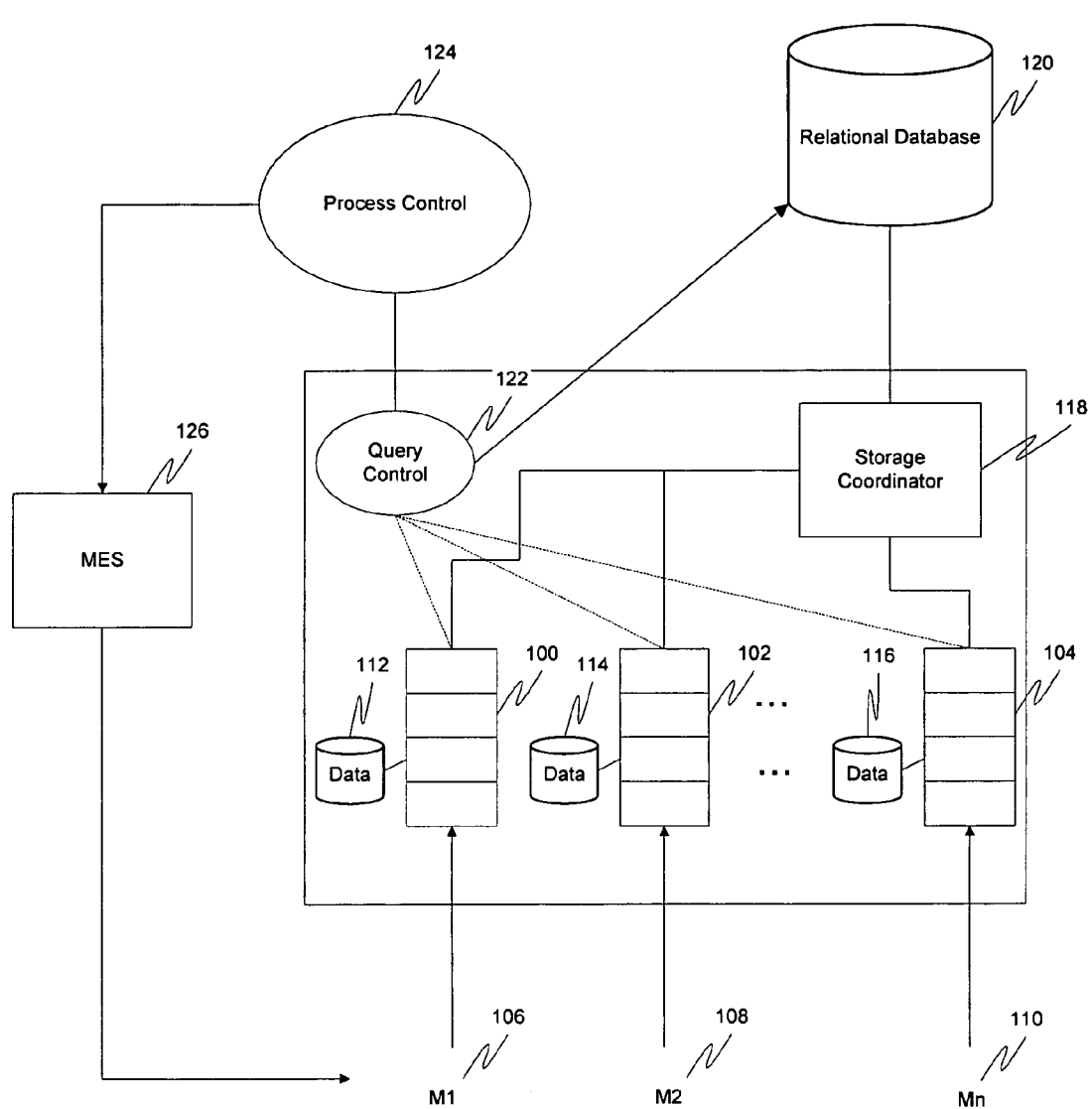
FIG. 1 is a block diagram illustrating a data management system in accordance with an embodiment of the present invention.

FIG. 1 is a block diagram illustrating a data management system in accordance with an embodiment of the present invention. One or more caches 100, 102, 104, may be provided to temporarily store the incoming real-time high-speed data from various machines 106, 108, 110. In an embodiment of the present invention, each cache is linked to a specific machine, but one of ordinary skill in the art will recognize that there could two or more machines could share a cache, or two or more caches may be provided for different input streams from a single machine.

As incoming data is received by the caches, the data may be immediately persisted into backup files 112, 114, 116, to guard against power failures and other significant problems that would result in the loss of data in the cache. Each of the caches 100, 102, 104, may be coupled to a storage coordinator 118. The storage coordinator 118 may act like a funnel, slowing down the writing of information to the relational database 120 to an efficient block transaction that can be handled by the interface to the relational database. The storage coordinator 118 may also precondition the data so that it is an format that is easy to mine. This greatly improves the speed at which a user may mine the data at a later time. This preconditioning will be described in more detail later.

In order to provide real-time data analysis, a query control 122 may be coupled to each of the caches 100, 102, 104. In an embodiment of the present invention, the query control 122 may keep track of the time frame of information stored in each cache. For example, cache 100 may contain the last 3 seconds of real-time data, whereas cache 102 may contain only the last 1 second of real-time data. The query control 122 may then determine when a query request arrives whether or not the query can be satisfied with information in one of the caches, or if it needs to go to the database (or a combination of the two). For example, if the query control 122 receives a request for information from machine 106 that is 2 seconds old, then the query control 122 is able to determine that such a request can be satisfied by cache 100 as cache 100 corresponds to machine 106, and it holds the last 3 seconds of real-time data. It therefore may serve the query request on the cache 100. However, if a similar request came in for machine 108, it would know that the request cannot be satisfied by cache 102, even though cache 102 corresponds to machine 108, because cache 102 only holds the last 1 second of real-time data. It therefore knows it needs to instead query the relational database 120.

In another embodiment of the present invention, each cache may have an associated event cache. Events are one type of data received from the data source. Events are valid for a moment in time, for example start job and end job. These discrete events may have been received from the input source in addition to the time-series "trace" data (gas pressure, for example). The query control can use the event identifications to look up time markers that can then be used to look up data in the cache or relational database, such as return all gas pressure data between start job and end job.

The time frame of information stored in each cache may be tracked by the query control 122 using time stamps pointing to offsets in each file. The timestamps may indicate the starting time of each block and the ending time of each block.

By passing query requests that cannot be fulfilled by the caches to the relational database, the present invention greatly reduces the number of queries sent to each cache. This reduces the load on the caches and enables queries that can be fulfilled by the cache to be fulfilled in real time.

The information from the query may be utilized by a process control mechanism fault detection and classification (FDC), or advanced process control (APC) 124, for real-time analysis, which may pass the information to some sort of machine control tool, such as Manufacturing Execution Systems (MES) 126. This may then be a part of a feedback loop back to the machines 106, 108, 110 to improve yield.

Referring back to the preconditioning of data by the storage coordinator 118, because the system does not know the names of the various pieces of the data ahead of time it is necessary to make the preconditioning dynamic. In an embodiment of the present invention, this is accomplished by creating 3 tables, a string table, a floating point table, and an integer table. These make it easier to create an efficient data structure. Each of these 3 tables may be organized as a two dimensional table having time on one axis, the name on another axis, and the value of the data in the body of the grid. An example of this is illustrated in FIG. 2. Separately, a mapping layer may then be built that indicates which name gets stored in which column of which table. This structure allows a user to mine the data quickly by referring the mapping layer first, before going directly to the appropriate column of the appropriate table.

Figure 3:
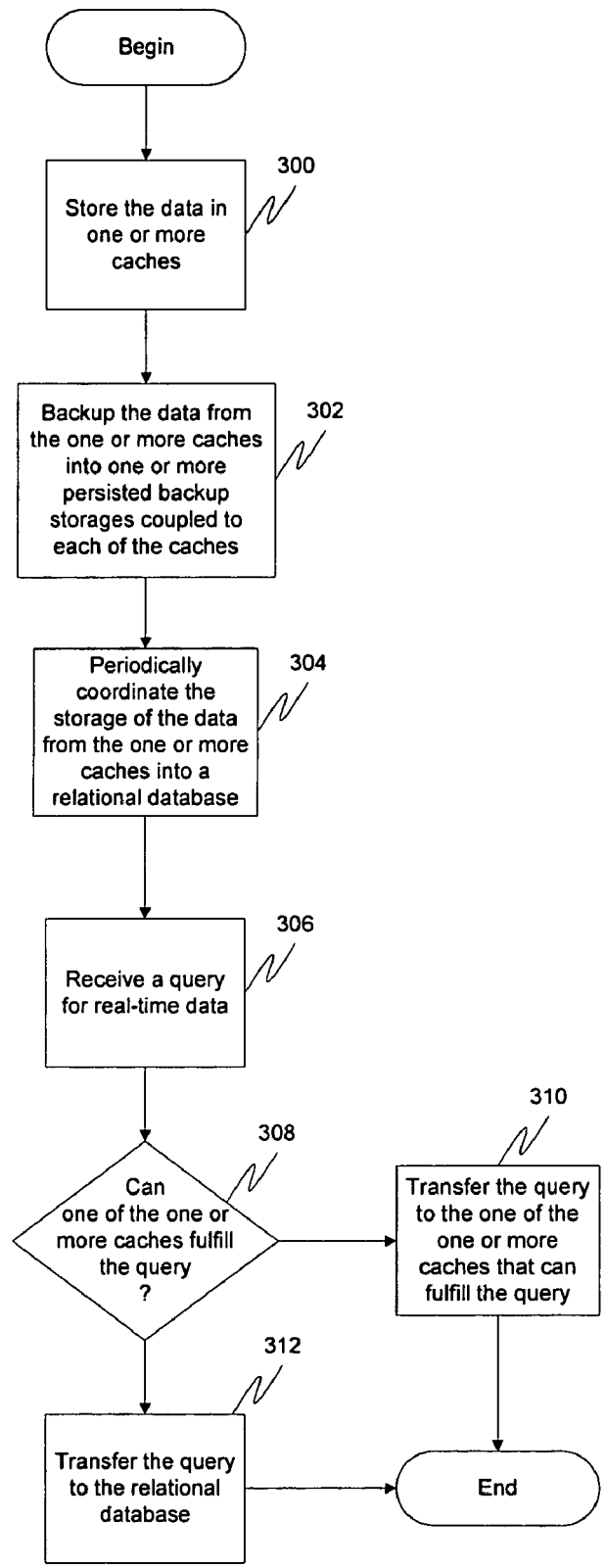
FIG. 3 is a flow diagram illustrating a method for managing data from one or more high-speed source in accordance with an embodiment of the present invention.

FIG. 3 is a flow diagram illustrating a method for managing data from one or more high-speed source in accordance with an embodiment of the present invention. Each act in this method may be executed by hardware, software, or any combination thereof. At 300, the data may be stored in one or more caches. In one embodiment, each of the caches corresponds to a single data source, for example, a manufacturing machine having sensors. At 302, the data may be backed up from the one or more caches into one or more persisted backup storages coupled to each of the caches. At 304, the storage of the data from the one or more caches into a relational database may be coordinated. This may be done on a periodic basis, and may include parsing the data into a string table, a floating point table, and an integer table, and creating a mapping layer indicating which portions of the string table, floating point table, or integer table contain the data. The string table, floating point table, and integer tables may each contain two axes and a body, wherein one of the axes corresponds to time and a second of the axes corresponds to name, wherein the body contains values for the data for corresponding name/time combinations.

At 306, a query for real-time data may be received. At 308, it may be determined if the query for real-time data can be fulfilled by information in one of the one or more caches. This may include examining information as to the time frame of information being stored in each of the one or more caches and determining if a time indicated by the query is inside the time frame of information for a cache corresponding to a data source indicated by the query. If so, then at 310 the query may be transferred to the one of the one or more caches that can fulfill the query. If not, however, then at 312, the query may be transferred to the relational database.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A data management system comprising:
   a processor;
   a relational database;
   one or more caches coupled to one or more data sources, wherein each of the caches contain information sampled and received only during a particular time frame;

a query control coupled to said one or more caches and to said relational database, said query control designed to determine if an incoming query can be fulfilled by one of said one or more caches, and to pass said query to said relational database if it cannot, wherein the determining includes comparing a time frame of data requested by the incoming query to the particular time frame contained in the cache, wherein said query control is further designed to pass said query to one of said one or more caches if the incoming query can be fulfilled by said one of said one or more caches; and a feedback system coupled to said query control and to said one or more data sources, said feedback system designed to send one or more queries to said query control and to adjust operation of said one or more data sources based on information resulting from said one or more queries.

2. The data management system of claim 1, wherein each of said one or more caches corresponds to a single data source.

3. The data management system of claim 1, wherein each of said data sources is a manufacturing machine having sensors.

4. The data management system of claim 1, further comprising:
a persisted backup storage coupled to each of said caches.

5. The data management system of claim 1, wherein said caches are configured to be loaded with all data from a machine as the data is received.

6. The data management system of claim 1, further comprising:
a storage coordinator coupled to said one or more caches and to said relational database, said storage coordinator designed to funnel information from said one or more caches for storage in said relational database.

7. The data management system of claim 6, wherein said storage coordinator is further designed to precondition said information from said one or more caches in a string table, floating point table, or integer table, as well as a mapping layer indicating which portions of said string table, floating point table, or integer table contain said information.

8. The data management system of claim 1, further comprising:
one or more event caches coupled to said one or more caches.

9. The data management system of claim 1, wherein said query control is designed to use event identifications in said event caches to lookup time markers which can be used to lookup data in said one or more caches or said relational database.

10. A method for managing data from one or more high-speed sources, the method comprising:
storing the data in one or more caches;
periodically coordinating storage of data from said one or more caches into a relational database;
receiving a query for real-time data;
determining if said query for real-time data can be fulfilled by information in one of said one or more caches, wherein the one of said one or more caches contains only data sampled and received during a particular time frame, wherein the determining includes comparing a time frame of data requested in the incoming query to the particular time frame;
transferring said query to said one of said one or more caches if said query can be fulfilled by information in said one of said one or more caches; and
transferring said query to said relational database if said query cannot be fulfilled by information in one of said one or more caches.

11. The method of claim 10, wherein each of said one or more caches corresponds to a single data source.

12. The method of claim 10, wherein each of said data sources is a manufacturing machine having sensors.

13. The method of claim 10, further comprising backing up said data from said one or more caches into one or more persisted backup storages coupled to each of said caches.

14. The method of claim 10, wherein said determining includes:
examining information as to a time frame of information being stored in each of said one or more caches; and
determining if a time indicated by said query is inside said time frame of information for a cache corresponding to a data source indicated by said query.

15. The method of claim 10, wherein said periodically coordinating includes:
parsing the data into a string table, a floating point table, or an integer table; and
creating a mapping layer indicating which portions of said string table, floating point table, or integer table contain the data.

16. The method of claim 15, wherein said string table, floating point table, or integer table contains two axes and a body, one of said axes corresponding to time and a second of said axes corresponding to name, wherein said body contains values of said data for corresponding name/time combinations.

17. The method of claim 10, wherein said determining includes using event identifications stored in an event cache associated with each cache to look up time markers.

18. An apparatus for managing data from one or more high-speed sources, the apparatus comprising:
means for storing the data in one or more caches;
means for periodically coordinating storage of data from said one or more caches into a relational database;
means for receiving a query for real-time data;
means for determining if said query for real-time data can be fulfilled by information in one of said one or more caches, wherein the one of said one or more caches contains only data sampled and received during a particular time frame, wherein the determining includes comparing a time frame of data requested in the incoming query to the particular time frame;
means for transferring said query to said one of said one or more caches if said query can be fulfilled by information in said one of said one or more caches; and
means for transferring said query to said relational database if said query cannot be fulfilled by information in one of said one or more caches.

19. The apparatus of claim 18, wherein each of said one or more caches corresponds to a single data source.

20. The apparatus of claim 18, wherein each of said data sources is a manufacturing machine having sensors.

21. The apparatus of claim 18, further comprising means for backing up said data from said one or more caches into one or more persisted backup storages coupled to each of said caches.

22. The apparatus of claim 18, wherein said means for determining includes:
means for examining information as to a time frame of information being stored in each of said one or more caches; and means for determining if a time indicated by said query is inside said time frame of information for a cache corresponding to a data source indicated by said query.

23. The apparatus of claim 18, wherein said means for coordinating includes:
   means for parsing the data into a string table, a floating point table, or an integer table; and
   means for creating a mapping layer indicating which portions of said string table, floating point table, or integer table contain the data.

24. The apparatus of claim 23, wherein said string table, floating point table, or integer table contains two axes and a body, one of said axes corresponding to time and a second of said axes corresponding to name, wherein said body contains values of said data for corresponding name/time combinations.

25. The apparatus of claim 18, wherein said means for determining includes using event identifications stored in an event cache associated with each cache to look up time markers.

26. A program storage device readable by a machine, tangibly embodying a program of instructions executable by the machine to perform a method for managing data from one or more high-speed sources, the method comprising:
   storing the data in one or more caches;
   periodically coordinating storage of data from said one or more caches into a relational database;
   receiving a query for real-time data;
   determining if said query for real-time data can be fulfilled by information in one of said one or more caches, wherein the one of said one or more caches contains only data sampled and received during a particular time frame, wherein the determining includes comparing a time frame of data requested in the incoming query to the particular time frame;
   transferring said query to said one of said one or more caches if said query can be fulfilled by information in said one of said one or more caches; and
   transferring said query to said relational database if said query cannot be fulfilled by information in one of said one or more caches.

* * * * *